(12) United States Patent
Endo et al.

(10) Patent No.: US 9,107,437 B2
(45) Date of Patent: Aug. 18, 2015

(54) LOW COMMON SALT SOY SAUCE AND METHOD FOR PRODUCING THE SAME

(75) Inventors: Yoshikazu Endo, Chiba (JP); Yoichi Hanada, Chiba (JP)

(73) Assignee: KIKKOMAN CORPORATION, Chiba (JP)

( * ) Notice: Subject to any disclaimer, the term of this patent is extended or adjusted under 35 U.S.C. 154(b) by 116 days.

(21) Appl. No.: 13/496,434

(22) PCT Filed: Sep. 14, 2010

(86) PCT No.: PCT/JP2010/065818
§ 371 (c)(1),
(2), (4) Date: Mar. 15, 2012

(87) PCT Pub. No.: WO2011/034049
PCT Pub. Date: Mar. 24, 2011

(65) Prior Publication Data
US 2012/0177783 A1    Jul. 12, 2012

(30) Foreign Application Priority Data
Sep. 18, 2009  (JP) ................................. 2009-216302

(51) Int. Cl.
*A23L 1/238* (2006.01)
*A23L 1/305* (2006.01)
*A23L 1/20* (2006.01)

(52) U.S. Cl.
CPC ............... *A23L 1/238* (2013.01); *A23L 1/2005* (2013.01); *A23L 1/3053* (2013.01)

(58) Field of Classification Search
CPC ........................................................ A23L 1/238
USPC ......................................................... 426/46, 634
See application file for complete search history.

(56) References Cited

U.S. PATENT DOCUMENTS

| 4,117,169 | A | * | 9/1978 | Noda et al. ......................... 426/7 |
| 5,352,464 | A | * | 10/1994 | Kotegawa ......................... 426/18 |
| 5,869,115 | A | * | 2/1999 | Fukushima et al. .......... 426/20 |

(Continued)

FOREIGN PATENT DOCUMENTS

| CN | 2007-049917 A | 3/2007 |
| CN | 101060793 A | 10/2007 |

(Continued)

OTHER PUBLICATIONS

Singapore Search Report and Written Opinion dated Jun. 21, 2013 issued by the Intellectual Property Office of Singapore in related Singapore Patent Application No. 201201889-1 (16 pages).

(Continued)

*Primary Examiner* — Felicia King
(74) *Attorney, Agent, or Firm* — Lucas & Mercanti LLP (57) ABSTRACT

The present invention provides a soy sauce powder having a favorable flavor and containing 2-phenyl ethanol and succinic acid at high concentrations. The low common salt soy sauce of the present invention is obtained by a method for producing a low common salt soy sauce, which includes adding a carbohydrate raw material to moromi in which the viable soy sauce yeast cell count per 1 g of moromi is 1×10⁷ cells or more, adjusting the common salt concentration of the moromi in a manner such that the common salt concentration in moromi juice after maturation is 4.0 to 12.0 w/v %, and carrying out fermentation and maturation of the moromi. The pH of the obtained low common salt soy sauce is 4.7 to 6.0.

2 Claims, 1 Drawing Sheet

(56) References Cited

U.S. PATENT DOCUMENTS

| | | | |
|---|---|---|---|
| 2006/0115518 A1 | 6/2006 | Tsuchiya et al. | |
| 2008/0057174 A1* | 3/2008 | Yamakoshi et al. | 426/589 |
| 2008/0241316 A1* | 10/2008 | Hanada et al. | 426/46 |
| 2009/0098246 A1* | 4/2009 | Hanada et al. | 426/46 |

FOREIGN PATENT DOCUMENTS

| | | |
|---|---|---|
| EP | 0 594 166 A1 | 4/1994 |
| EP | 1 428 440 A1 | 6/2004 |
| EP | 1 808 084 A1 | 7/2007 |
| JP | 52-030599 B | 8/1977 |
| JP | 56-160966 A | 12/1981 |
| JP | 58-193677 A | 11/1983 |
| JP | 02-117364 A | 5/1990 |
| JP | 03-160985 A | 7/1991 |
| JP | 04-311366 A | 11/1992 |
| JP | 05-219915 A | 8/1993 |
| JP | 05-227915 A | 9/1993 |
| JP | 3065695 B2 | 7/2000 |
| JP | 1162094 C | 2/2003 |
| JP | 2007-252242 A | 10/2007 |
| JP | 2007-289083 A | 11/2007 |

OTHER PUBLICATIONS

Saito, N., "Study of Merchandise on Shoyu (Soy Sauce) Part 2," Journal of the Brewing Society of Japan, vol. 89, No. 7, 1994, pp. 498 to 504.

Yoshizawa, K., Brewed/fermented Food Dictionary, Jan. 15, 2002, pp. 72-73, 83-86 and 88.

International Search Report mailed Nov. 30, 2010 in related PCT International Application PCT/JP2010/065818 (4 pages).

Kazuhiro Kusumegi, et al., "Aroma Formation by Shoyu Yeast Mutants Resistant to Amino Acid Analogues," J. Brew. Soc. Japan, vol. 92, No. 11, pp. 827-834 (1997) (8 pages).

Notice of Reason for Rejection issued by the Japanese Patent Office, which was mailed on Oct. 7, 2014 in Japanese Application No. 2011-531928 with English translation (7 pages).

Communication (Office Action) dated Jan. 24, 2013 issued by the Chinese Patent Office in related Chinese Patent Application No. 201080042038.5 and English Translation (8 pages).

Extended European Search Report dated Feb. 17, 2014 issued by European Patent Office in related application EP 10817162.0, 4 pages.

Database FSTA [Online] International Food Information Service (IFIS), Frankfurt-Main, DE; Takemura, M. et al., "Production of a soy sauce-like new seasoning fluid with fermentation of a mixture of dried okara (bean-curd refuse) and rice powder (shiro-nuka). V. Studies on the utilization of okara." XP002719772 Abstact & Takemura, M. et al.; Journal of the Japanese Society for Food Science and Technology, vol. 45, No. 10, 1998, p. 589-594, Fukuoka Women's Junior College, 16-1, 4-chrome, Gojyo, Dazaifu-Shi, Fukuoka 818-0193 Japan.

Horitsu, H. et al., "A New Process of Soy Sauce Fermentation by Immobilized Yeasts", Agricultural and Biological Chemistry, Japan Soc. for Bioscience, Biotechnology and Agrochem, Tokyo, JP, vol. 54, No. 2, Jan. 1, 1990, pp. 295-300.

* cited by examiner

LOW COMMON SALT SOY SAUCE AND METHOD FOR PRODUCING THE SAME

CROSS-REFERENCE TO RELATED APPLICATIONS

This application is a U.S. national phase application under 35 USC 371 of international Application PCT/JP2010/065818 filed Sep. 14, 2010, which claims priority from Japanese Application No. 2009-216302 filed Sep. 18, 2009, the entire disclosure of each of which is incorporated herein by reference.

TECHNICAL FIELD

The present invention relates to a low common salt soy sauce having a favorable flavor. In particular, the present invention relates to a low common salt soy sauce containing ethanol, 2-phenyl ethanol, isobutyl alcohol, and isoamyl alcohol, which are known as important aromatic components in soy sauce, at high concentrations, and further containing succinic acid, which is a taste component, at a high concentration. Further, the present invention relates to a method for producing a low common salt soy sauce that allows the above low common salt soy sauce to be readily obtained without using special means. The present invention also relates to a soy sauce powder having a favorable flavor and containing 2-phenyl ethanol and succinic acid at high concentrations, which is characterized by its ability to prevent powder consolidation with high stability.

BACKGROUND ART

Soy sauce is produced through mixing of steam-boiled soybeans and roasted and milled wheat, inoculation and culture of a seed koji mold for soy sauce therein to result in a soy sauce koji, addition of an adequate amount of an aqueous common salt solution to prepare moromi (a kind of mash), formation of mature moromi via fermentation and maturation for a certain period of time, press, filtration, pasteurisation (sterilzation), and clarification.

It is known that the thus obtained soy sauce contains 250 or more types of aroma components such as flower and fruit aroma components and aroma components from a variety of liquors and vinegars. Differences in types or amounts of such aromas characterize the soy sauce aroma. Soy sauce generally contains alcohols that constitute soy sauce aroma components at concentrations of 2% to 3%. It is known that such alcohols facilitate the heat cooking of food materials and enliven aroma components (see, for example, Non-Patent Literature 1).

In addition, among the above alcohols, ethanol, 2-phenyl ethanol, isobutyl alcohol, isoamyl alcohol, and the like are known as aromatic components having favorable influences on soy sauce quality (see, for example, Non-Patent Literature 2).

In particular, it is known that 2-phenyl ethanol has a rose-like aroma and thus it is an important aromatic component contained in soy sauce (see, for example, Patent Literature 1).

Therefore, soy sauce production methods for producing brewed soy sauce containing the above alcohols at high concentrations have been studied.

It is well known that succinic acid is an umami (pleasant savory taste) component contained in shellfish and the like. It is also known that succinic acid is generated during soy sauce brewing and serves as a taste component having favorable influences on soy sauce quality (see, for example, Non-Patent Literature 2).

Meanwhile, the growing interest in health has boosted the popularity of food with reduced common salt in recent years. Accordingly, the demand for low common salt soy sauce has been increasing in the soy sauce market. Also, there is large demand for low common salt soy sauce powders used in the market for condiments for professional use and processed foods.

Hitherto, various low common salt soy sauce production methods have been examined. Examples of such methods include: a method comprising using water in which potassium chloride has been dissolved instead of an aqueous common salt solution; a method comprising using an aqueous low-concentration common salt solution to which ethanol has been added instead of an ordinary aqueous common salt solution; a method comprising using a raw soy sauce instead of an aqueous common salt solution to produce a thick soy sauce and diluting the thick soy sauce with water in the final step; and a method comprising desalting soy sauce using an ion-exchange membrane or a particular resin.

In addition, there is a known method comprising keeping the common salt concentration in soy sauce moromi at a low level of approximately 10 w/v % (i.e., the percent (%) of common salt in moromi juice) and providing certain conditions that prevent proliferation or survival of so-called spoilage bacteria that cause spoilage of moromi so as to prevent spoilage; that is to say, a method comprising keeping the moromi temperature at 40° C. or more (e.g., 55° C. in an extreme case) by heating. In general, spoilage bacteria are weakened under acidic conditions. In this regard, there is a known method for preventing proliferation of spoilage bacteria by adding an acid such as hydrochloric acid or lactic acid to moromi and keeping the pH at 4.0 or less (e.g., 3.0 in an extreme case). For example, Patent Literature 2 teaches that it is possible to prevent spoilage of moromi in the maturation phase during production of an alcohol-containing condiment by adding lactic acid to moromi so as to keep the pH at 4.5 or less, and preferably at 3.5 to 4.2.

However, the above methods require using special means. This inevitably results in flavor deterioration. In such cases, it is difficult to obtain a low common salt soy sauce or soy sauce powder having a more satisfactory aroma and taste than conventional brewed soy sauces. In view of the above, establishment of a method for producing a low common salt soy sauce having a favorable flavor has been awaited.

Meanwhile, conventional soy sauce powders are likely to become hygroscopic and deliquescent and thus they easily form powder blocks during storage. In addition, such soy sauce powders are disadvantageous in that they are more likely to become sticky and thus they are less likely to be uniformly mixed with other powder components.

A conventionally known method for overcoming such disadvantages of dried and powderized soy sauce is a method comprising: adding water or an aqueous common salt solution to moromi after alcohol fermentation (i.e., soy sauce moromi obtained within a period from the 40th day after the start of production to immediately before press) so as to result in a concentration of 13% (w/w) or more, adding soy sauce yeast thereto, and carrying out culture to adjust the direct reducing sugar concentration in soy sauce moromi juice or soy sauce to 1.5% (w/v) or less (Patent Literature 3).

However, no method for overcoming the aforementioned disadvantages of soy sauce powders without using special means so as to obtain a soy sauce powder having a favorable flavor and containing 2-phenyl ethanol and succinic acid at high concentrations has been known.

CITATION LIST

Patent Literature

Patent Literature 1: JP Patent No. 2609580
Patent Literature 2: JP Patent Publication (Kokoku) No. 52-30599 B (1977)
[Patent Literature 3: JP Patent Publication (Kokai) No. 2007-252242 A Non-Patent Literature
Non-Patent Literature 1: Journal of the Brewing Society of Japan, Vol. 89, No. 7, 1994, pp. 498 to 504
Non-Patent Literature 2: Brewed/fermented food dictionary (*Jozo/Hakko Shokuhin no Jiten*), Asakura Publishing Co., Ltd., written by Kiyoshi Yoshizawa, published on Jan. 15, 2002, pp. 72 to 73, pp. 83 to 86, and p. 88 ("Appendix table: Brewed product and components")

SUMMARY OF INVENTION

Technical Problem

An object of the present invention is to obtain a low common salt soy sauce having a favorable flavor, and, in particular, a low common salt soy sauce having a favorable flavor, containing ethanol, 2-phenyl ethanol, isobutyl alcohol, and isoamyl alcohol, which are known as important aromatic components in soy sauce, at high concentrations, and further containing succinic acid, which is a taste component, at a high concentration, without using special means. Another object of the present invention is to obtain a soy sauce powder having a favorable flavor and containing 2-phenyl ethanol and succinic acid at high concentrations by overcoming disadvantages of conventional soy sauce powders without using special means.

Solution to Problem

As a result of intensive studies in order to achieve the above objects, the present inventors found that a low common salt soy sauce having a favorable flavor can be obtained according to a method for producing a low common salt soy sauce which comprises adding carbohydrate raw materials to moromi in which viable soy sauce yeast cell count per 1 g of moromi has reached $1 \times 10^7$ cells or more, adding water or an aqueous common salt solution thereto so as to adjust the common salt concentration of the moromi in a manner such that the common salt concentration in moromi juice after maturation is 4.0 to 12.0 w/v %, and then causing fermentation and maturation of moromi without causing spoilage of moromi, and that, according to said method, a low common salt soy sauce having a favorable flavor containing the alcohols at high concentrations can be obtained. In addition, the present inventors found that a low common salt soy sauce having a favorable flavor, which has a common salt concentration of 4.0 to 12.0 w/v % and an ethanol concentration of 4.0 to 10.0 v/v %, and in which the 2-phenyl ethanol concentration per 1.0 w/v % of total nitrogen concentration is 7.0 µg/ml or more, the isobutyl alcohol concentration per 1.0 w/v % of total nitrogen concentration is 10.0 µg/ml or more, and the isoamyl alcohol concentration per 1.0 w/v % of total nitrogen concentration is 15.0 µg/ml or more. Further, the present inventors found that the low common salt soy sauce, in which the succinic acid concentration per 1.0 w/v % of total nitrogen concentration is 500 µg/ml or more, can be obtained. Moreover, the present inventors found that the above disadvantages of soy sauce powder are overcome by a method for producing a low common salt soy sauce which comprises adding carbohydrate raw materials to moromi in which viable soy sauce yeast cell count per 1 g of moromi has reached $1 \times 10^7$ cells or more, adding water or an aqueous common salt solution thereto so as to adjust the common salt concentration of the moromi in a manner such that the common salt concentration in moromi juice after maturation is 4.0 to 12.0 w/v %, causing fermentation and maturation of moromi, and adjusting the glucose concentration in moromi juice to 5.0 mg/ml or less per 1.0 w/v % of total nitrogen concentration, and that a soy sauce powder having a favorable flavor and containing 2-phenyl ethanol and succinic acid at high concentrations is successfully obtained. The present invention has been completed based on the above findings.

Specifically, the present invention relates to a low common salt soy sauce or soy sauce powder having a favorable flavor and a method for producing the same.

(1) A low common salt soy sauce, which has a common salt concentration of 4.0 to 12.0 w/v % and an ethanol concentration of 4.0 to 10.0 v/v %, and in which the 2-phenyl ethanol concentration per 1.0 w/v % of total nitrogen concentration is 7.0 µg/ml or more, the isobutyl alcohol concentration per 1.0 w/v % of total nitrogen concentration is 10.0 µg/ml or more, and the isoamyl alcohol concentration per 1.0 w/v % of total nitrogen concentration is 15.0 µg/ml or more.

(2) The low common salt soy sauce according to (1), wherein the succinic acid concentration per 1.0 w/v % of total nitrogen concentration is 500 µg/ml or more.

(3) The low common salt soy sauce according to (1), wherein the glucose concentration per 1.0 w/v % of total nitrogen concentration is 5.0 mg/ml or less.

(4) A method for producing a low common salt soy sauce, which comprises adding a carbohydrate raw material to moromi in which the viable soy sauce yeast cell count per 1 g of moromi is $1 \times 10^7$ cells or more, adjusting the common salt concentration of the moromi in a manner such that the common salt concentration in moromi juice after maturation is 4.0 to 12.0 w/v %, and carrying out fermentation and maturation of the moromi, and wherein the pH of the moromi juice after fermentation and maturation is 4.7 to 6.0.

(5) The method for producing a low common salt soy sauce according to (4), wherein the carbohydrate raw material is any one of the following 1) to 4).

1) At least one member selected from the group consisting of glucose, maltose, fructose, a hydrochloric-acid-hydrolyzed starch liquid, an enzymatically saccharified starch liquid, and at least one starch-rich koji selected from the group consisting of starch-rich soy sauce koji which is prepared with the use of raw materials comprising starch raw materials accounting for more than 65 w/w % of the raw materials and protein raw materials accounting for the remaining proportion thereof, rice koji, mugi koji, maize koji, and bran koji.

2) A combination of: at least one carbohydrate raw material A selected from the group consisting of glucose, maltose, fructose, a hydrochloric-acid-hydrolyzed starch liquid, an enzymatically saccharified starch liquid, sucrose, a gelatinized cereal, and a gelatinized root or tuber crop; and at least one koji selected from the group consisting of soy sauce koji, rice koji, mugi koji, maize koji, and bran koji.

3) A combination of: the carbohydrate raw material A; at least one protein raw material selected from the group consisting of soybean, defatted soybean, wheat gluten, and corn gluten; and the koji.

4) A combination of the starch-rich koji and the protein raw material.

(6) The method for producing a low common salt soy sauce according to (4) or (5), wherein the following conditions are satisfied:

$$4.0 \leq X \leq 12.0$$

$$Y \geq -0.005X + 0.16$$

$$Y \leq -0.005X + 0.24$$

wherein X denotes the common salt concentration (w/v %) in moromi juice after fermentation and maturation and Y denotes the proportion of the sum of the total sugar amount (kg) in moromi juice immediately before the addition of carbohydrate raw materials and the total sugar amount (kg) in raw materials to be added with respect to the volume (L) of moromi after fermentation and maturation (kg/L).
(7) A soy sauce powder, which contains 2-phenyl ethanol at a concentration of 7.0 μg/g or more per 1.0% (w/w) of total nitrogen and succinic acid at a concentration of 500 μg/g or more per 1.0% (w/w) of total nitrogen.
(8) A method for producing a soy sauce powder, which comprises drying and powderizing a low common salt soy sauce obtained by the method according to (4), (5), or (6).

Advantageous Effects of Invention

According to the present invention, a low common salt soy sauce or soy sauce powder having a favorable flavor can be obtained. In particular, a low common salt soy sauce having a favorable flavor, containing ethanol, 2-phenyl ethanol, isobutyl alcohol, and isoamyl alcohol, which are known as important aromatic components in soy sauce, at high concentrations, and further containing succinic acid, which is a taste component, at a high concentration can be obtained without using special means. In addition, disadvantages of conventional soy sauce powders can be overcome without using special means, and a soy sauce powder having a favorable flavor and containing 2-phenyl ethanol and succinic acid at high concentrations can be obtained.

This description includes part or all of the contents as disclosed in the description and/or drawings of Japanese Patent Application No. 2009-216302, which is a priority document of the present application.

DESCRIPTION OF EMBODIMENTS

The low common salt soy sauce or soy sauce powder and a method for producing the same of the present invention are described in detail below.

The present invention is carried out with the use of a soy sauce production method comprising adding soy sauce koji to an aqueous common salt solution and controlling the moromi temperature at 15° C. to 30° C. for approximately 3 to 8 months. In the method, carbohydrate raw materials are added to the following (1) or (2): (1) moromi in which the viable soy sauce yeast cell count per 1 g of moromi has reached $1 \times 10^7$ cells or more and, in particular, $3 \times 10^7$ cells to $3 \times 10^8$ cells after the elapse of approximately a half month to 3 months from the date of start of production; or (2) moromi in which the viable soy sauce yeast cell count per 1 g of moromi has reached $1 \times 10^7$ cells or more due to the addition of a soy sauce yeast culture liquid separately obtained via culture to soy sauce moromi before or during alcohol fermentation.

A soy sauce koji used in a usual process for producing a brewed soy sauce can be used. A soy sauce koji can be prepared in the following manner. Steam-boiled and denatured protein raw materials such as soybeans and defatted soybeans and heat-denatured starch raw materials such as mugi (wheat, barley, rye, or adlay) and rice, are mixed. The moisture content of the mixture is adjusted to 35% to 45% (w/w). Then, seed koji molds such as *Aspergillus sojae* and *Aspergillus oryzae* are inoculated therein, and cultured at 20° C. to 40° C. for 1.5 to 4 days. The heat denaturation of magi is preferably performed by roasting and milling, while the heat denaturation of rice is preferably performed by steam-boiling or cooking with a rice cooker.

Soy sauce moromi is prepared by mixing soy sauce koji and an aqueous common salt solution. The amount of the aqueous common salt solution is not particularly limited. However, in general, it is preferable to prepare soy sauce moromi with the addition of an aqueous common salt solution at an amount that accounts for 100% to 450% (v/v) of the volume of plant seeds such as soybeans or wheat grains used for preparation of soy sauce koji (in terms of the fresh raw seed volume). According to the present invention, "the plant seed volume" refers to "bulk volume" including voids when measurement is carried out using a graduated cylinder or the like. An aqueous common salt solution is mixed with soy sauce koji so that the common salt concentration in moromi prior to the addition of carbohydrate raw materials is equivalent to the common salt concentration in soy sauce moromi defined according to a general soy sauce production method, and such concentration is typically 15.0 to 20.0 w/v %.

It is important to add carbohydrate raw materials when the viable soy sauce yeast cell count per 1 g of moromi has reached $1 \times 10^7$ cells or more. If carbohydrate raw materials are added when the viable cell count is below this level, active alcohol fermentation cannot be expected to take place, resulting in a disadvantageous increase in the risk of spoilage of moromi.

In addition, it is also important to add carbohydrate raw materials to moromi in which the the viable soy sauce yeast cell count per 1 g of moromi has reached $1 \times 10^7$ cells or more and then to add water or an aqueous common salt solution so as to adjust the common salt concentration of the moromi in a manner such that the common salt concentration in moromi juice after maturation is 4.0 to 12.0 w/v %. If the concentration is less than 4.0 w/v %, there is a disadvantageous risk of spoilage of soy sauce moromi. On the other hand, if it is more than 12.0 w/v %, generation/accumulation of alcohols is reduced, making it impossible to obtain a low common salt soy sauce having a favorable flavor. Accordingly, in such cases, the object of the present invention cannot be achieved.

The main feature of the present invention is its ability to prevent spoilage of moromi. even when the common salt concentration in soy sauce moromi is adjusted to 4.0 to 12.0 w/v % during fermentation.

Specifically, according to a conventional soy sauce production method, soy sauce koji and an aqueous common salt solution are mixed (at the start of production) in an open system, and then the obtained moromi is fermented and matured in an open system. However, moromi is rich in nutritional sources appropriate for spoilage bacteria. Therefore, a decrease in the common salt concentration below a certain level causes active proliferation of spoilage bacteria. This results in the obvious manifestation of sour odor or taste, eventually leading to spoilage and strongly unpleasant odors.

Given that summer temperatures (i.e. 25° C. to 35° C.) fall within the optimal temperature range for the proliferation of so-called spoilage bacteria, there is no risk of spoilage when the common salt concentration in moromi is above a certain level; that is to say, when the concentration is 15% (w/v) or more. However, when the concentration is below such level, spoilage takes place in a relatively short period of time. Therefore, it is necessary to adjust the common salt concentration to the above level or higher based on the assumption that if the safe level of the common salt concentration in moromi in the summertime is 17 w/v %, the dangerous level thereof is 16 w/v % or less. In view of the above, it is said. that there is a risk of inhibition of smooth fermentation and maturation if the common salt concentration is less than 15 w/v %, even in an environment in which comprehensive measures for management of contamination with and proliferation of spoilage bacteria have been implemented.

Under the above circumstances, according to the present invention, even when the common salt concentration in soy sauce moromi is adjusted to 4.0 to 12.0 w/v % during fermentation, it is possible to prevent proliferation of spoilage bacteria without keeping the moromi temperature at 40° C. or higher (55° C. in an extreme case) by heating or maintaining the pH at 4.0 or less (3.0 or less in an extreme case) by adding an acid such as hydrochloric acid or lactic acid to moromi.

Examples of carbohydrate raw materials include: (I) glucose (e.g., crystal glucose, power glucose, or liquid glucose), maltose, fructose, sucrose, a gelatinized cereal (e.g., a mugi or rice), and a gelatinized root or tuber crop; (II) a saccharified liquid of starch raw material obtained via hydrochloric acid hydrolysis; (III) a saccharified liquid of starch obtained via enzymatic degradation; (IV) "starch-rich soy sauce koji" obtained by a conventional method for preparing soy sauce koji with the use of raw materials comprising starch raw materials (e.g., wheat, barley, rye, adlay, rice, and maize) accounting for more than 65 w/w % of the raw materials and protein raw materials (e.g., soybeans and gluten) accounting for the remaining proportion thereof, rice koji obtained using rice preferable for sake or low-quality rice such as milled Japanese rice or milled foreign rice, mug, koji obtained from barley, wheat or the like (barley koji, wheat koji, or the like), maize koji, and bran koji; and (V) saccharified koji from any of the above examples (e.g., amazake (traditional sweet drink made from fermented rice) or liquid of digested koji). These carbohydrate raw materials can be used alone or in combination.

In the present invention, the above carbohydrate raw materials are grouped as described below, and relevant terms are individually defined below.
(1) The term "carbohydrate raw material A" refers to at least one member selected from the group consisting of glucose, maltose, fructose, a hydrochloric-acid-hydrolyzed starch liquid, an enzymatically saccharified starch liquid, sucrose, a gelatinized cereal, and a gelatinized root or tuber crop.
(2) The term "koji" used herein refers to at least one member selected from the group consisting of soy sauce koji, rice koji, mugi koji, maize koji, and bran koji. Soy sauce koji also includes "starch-rich soy sauce koji" defined below.
(3) The term "starch-rich koji" refers to "starch-rich soy sauce koji" obtained by preparing soy sauce koji by a conventional method with the use of raw materials comprising starch raw materials such as wheat, barley, rye, adlay, rice, and maize accounting for more than 65 w/w % of the raw materials and protein raw materials such as soybeans or defatted soybeans accounting for the remaining proportion thereof, rice koji obtained from rice preferable for production of foods such as sake and steamed rice or low quality rice such as milled Japanese rice or milled non-Japanese rice, mugi koji obtained from barley, wheat or the like (barley koji, wheat koji, or the like), maize koji, and bran koji.
(4) The term "protein raw material" refers to at least one member selected from the group consisting of soybeans, defatted soybeans, wheat gluten, and corn gluten.

When the above carbohydrate raw materials are used in combination, preferable examples of a combination thereof include: 1) a combination of carbohydrate raw material A and koji; 2) a combination of carbohydrate raw material A, a protein raw material, and koji; and 3) a combination of starch-rich koji and a protein raw material.

An example of a saccharified liquid of starch raw material obtained via hydrochloric acid hydrolysis in (II) above is a liquid obtained by adding diluted hydrochloric acid (e.g., diluted hydrochloric acid (approximately 2 to 3 v/v %)) to a starch raw material such as wheat powder, milled rice, white bran, milled mugi grain, or maize such that the weight ratio of diluted hydrochloric acid to a starch raw material is approximately 2:1 to 4:1, heating the mixture at approximately 100° C. by a steam injection method or the like for 3 to 4 hours, and neutralizing the resultant to pH 5.0 to 6.0 using sodium carbonate, followed by filtration.

An example of a saccharified liquid of starch obtained via enzymatic degradation in (III) above is a liquid obtained by adding 1 to 3 parts by weight of an aqueous common salt solution (10 to 15 w/v %) to 1 part by weight of starch-rich koji and heating the mixture at 50° C. to 60° C. for 5 to 20 hours so as to saccharify starch in koji, Another example thereof is a liquid obtained by gelatinizing an aqueous starch suspension by heating, adding starch-rich koji or bran koji thereto to cause koji amylase to saccharify starch, and thereby degrading the starch into maltose and glucose.

Further, sucrose, a gelatinized cerial, or a gelatinized root or tuber crop added to moromi is saccharified by a saccharifying enzyme contained in soy sauce moromi. However, the level of amylase activity in soy sauce moromi falls far below the initial level by at least approximately a half month after the start of production, which is insufficient for saccharification. Therefore, it is preferable to add the above raw materials in combination with soy sauce koji, bran koji, rice koji, and/or mugi koji. By doing so, sucrose, a gelatinized cereal, or a gelatinized root or tuber crop can be quickly saccharified into glucose by amylase contained in newly added koji in moromi.

Moreover, protein raw materials added to moromi are hydrolyzed by protease or the like contained in soy sauce moromi. However, the level of protease activity in soy sauce moromi falls far below the initial level by at least approximately a half month after the start of production, which is insufficient for saccharification. Therefore, it is preferable to add the above raw materials in combination with soy sauce koji, bran koji, rice koji, and/or mugi koji. By doing so, protein raw materials can be degraded to amino acids and the like by protease or the like contained in newly added koji in moromi.

It is necessary to add carbohydrate raw materials in such an amount that the ethanol concentration of moromi juice after fermentation and maturation would be 4.0% or more, preferably 4 to 12.0 v/v %, and more preferably 4.0 to 10.0 v/v %. Specifically, the sum of the total sugar amount in moromi prior to the addition of carbohydrate raw materials and the total sugar amount in raw materials to be added is preferably 0.050 kg or greater, more preferably 0.100 to 0.250 kg, and most preferably 0.110 to 0.200 kg per 1 L of moromi (in total).

Specifically, according to the low common salt soy sauce production method of the present invention, carbohydrate raw materials and, if necessary, other raw materials are added to moromi containing $1 \times 10^7$ or more cells of soy sauce yeast per 1 g of moromi so that the following conditions are satisfied:

$$4.0 \leq X \leq 12.0$$

$$Y \geq -0.005X + 0.16$$

$$Y \leq -0.005X + 0.24$$

wherein X denotes the common salt concentration (w/v %) in moromi juice after fermentation and maturation and Y denotes the proportion of the sum of the total sugar amount (kg) in moromi juice immediately before the addition of carbohydrate raw materials and the total sugar amount (kg) in raw materials to be added with respect to the volume (L) of moromi after fermentation and maturation (kg/L). In addition, the above "raw materials to be added" are raw materials to be added to moromi that satisfy the above conditions regarding the number of yeast cells. Such materials include carbohydrate raw material A, koji starch-rich koji), protein raw materials, or others described above.

In addition, it is important to add carbohydrate raw materials so that the pH value after fermentation and maturation is 4.7 to 6.0. If the pH becomes less than 4.7 and particularly 4.5 or less, a soy sauce having acidic taste (an unusual taste) is obtained, and this differs disadvantageously from conventional soy sauces in terms of quality.

Further, when the common salt concentration in soy sauce moromi is maintained at a low common salt concentration of approximately 10 w/v % (i.e., the percent (%) of common salt in moromi juice), it is common to employ a method comprising adding an acid such as hydrochloric acid or lactic acid to moromi so as to prevent proliferation or survival of so-called spoilage bacteria that cause the spoilage of moromi (because, in general, spoilage bacteria are weakened under acidic conditions) and keeping the pH at 4.5 or less and preferably 3.5 to 4.2 (Patent Literature 2). However, with this method, it is impossible to avoid deterioration of flavor as a result of the addition of an acidulant such as hydrochloric acid, lactic acid, or acetic acid. Therefore, it is difficult to obtain a low common salt soy sauce or soy sauce powder having more satisfactory aroma and taste than conventional brewed soy sauces.

Then, the moromi obtained above is kept at 20° C. to 35° C. in accordance with a general method and subjected to agitation or aeration 1 to several times a day or subjected to agitation by means of compressed air, a propeller-type revolving agitator, or the like in an adequate manner so as to induce alcohol fermentation. Alternatively, it may be subjected to continuous agitation with aeration.

In the case of the above moromi, alcohol fermentation takes place in a very active manner, resulting in rapid ethanol formation. Therefore, moromi having an ethanol concentration of 4.0 to 10.0 v/v % can be readily obtained. In addition, other alcohols are produced and accumulated at large amounts in moromi. Accordingly, a low common salt soy sauce, in which the 2-phenyl ethanol concentration per 1.0 w/v % of total nitrogen concentration is 7.0 µg/ml or more, the isobutyl alcohol concentration per 1.0 w/v % of total nitrogen concentration is 10.0 µg/ml or more, and the isoamyl alcohol concentration per 1.0 w/v % of total nitrogen concentration is 15.0 µg/ml or more, and the succinic acid concentration per 1.0 w/v % of total nitrogen concentration is 500 µg/ml or more, can be readily obtained. The glucose concentration per 1.0 w/v % of total nitrogen concentration is preferably 5.0 mg/ml or less. The upper limits for the concentrations of 2-phenyl ethanol, isobutyl alcohol, isoamyl alcohol, and succinic acid in the low common salt soy sauce of the present invention are not particularly limited. However, typically, the concentrations of 2-phenyl ethanol, isobutyl alcohol, isoamyl alcohol, and succinic acid per 1.0 w/v % of total nitrogen concentration are 150.0 µg/ml or less, 250.0 µg/ml or less, 120.0 µg/ml or less, and 2000 µg/ml or less, respectively. The lower limit for the glucose concentration is not particularly limited. However, in general, it is 0.1 mg/ml or more per 1.0 w/v % of total nitrogen concentration.

The above moromi is matured for approximately a half month to 3 months after the completion of alcohol fermentation, and it is then subjected to press, filtration, pasteurisation, and clarification. Thus, the low common salt soy sauce of the present invention is obtained.

Drying and powderization of the low common salt soy sauce obtained above are carried out in accordance with a conventional soy sauce powder production method. An example of such method comprises adding an excipient such as dextrin to a soy sauce, dissolving the excipient therein by heating, and carrying out drying and powderization by spray drying, drum drying, freeze-drying, or the like. In general, a soy sauce powder obtained by drying and powderization undergoes a Maillard reaction as a result of heating or oxidization. Water generated through the reaction causes consolidation of the obtained powder, and thus the powder changes from a loose powder form to a block form. The low common salt soy sauce obtained in the present invention comprises a reducing sugar and glucose (which are causative substances of a Maillard reaction) at reduced content. Therefore, the soy sauce powder obtained in the present invention is unlikely to undergo block formation during storage. In addition, according to the present invention, it is possible to obtain a soy sauce powder having a favorable flavor characterized in that an an aqueous solution of the soy sauce powder contains 2-phenyl ethanol at a concentration of 7.0 µg/g or more per 1.0% (w/w) of total nitrogen and succinic acid at a concentration of 500 µg/g or more per 1.0% (w/w) of total nitrogen. The upper limits for the concentrations of 2-phenyl ethanol and succinic acid in the soy sauce powder of the present invention are not particularly limited. However, typically, the concentrations of 2-phenyl ethanol and succinic acid per 1.0% (w/w) of total nitrogen concentration are 150.0 µg/g or less and 2000 µg/g or less, respectively.

The present invention is more specifically described below with reference to the Examples.

Example 1

(1) Preparation of Soy Sauce Koji

Warm water (80° C.) was added to defatted soybeans (10 kg) (130 w/w %). The mixture was heated and steam-boned under pressure using saturated water vapor at a steam pressure of 2 kg/cm² (gauge pressure) for 20 minutes. In addition, raw wheat (10 kg) was roasted and milled by a conventional method. Next, the two processed raw materials were mixed to prepare a koji-making raw material with a moisture content of approximately 40 w/w %.

Next, this koji-making raw material was inoculated with a bran seed koji of *Aspergillus oryzae* (ATCC14895) (effective spore count: $1 \times 10^9$ spores/g) at 0.1 w/w %, which was then heaped in a container. The container was subjected to a usual koji-making process for 42 hours to obtain a soy sauce koji.

(2) Preparation of Soy Sauce Moromi

The above soy sauce koji (0.8 kg) was mixed with a 18 w/v % aqueous common salt solution (1.9 L). Next, a soy sauce lactic acid bacterium was added to the soy sauce moromi so that the cell count would be $1\times10^5$ cells per 1 g of moromi. Decomposition, elution, and lactic acid fermentation of raw materials with a soy sauce koji enzyme were carried out while keeping the moromi temperature at 15° C. for 1 month. Thus, soy sauce moromi (common salt concentration: approximately 15 w/v %) preferable for soy sauce yeast proliferation was obtained.

Soy sauce moromi preferable for soy sauce yeast proliferation (approximately 3 kg) was prepared for 4 lots (referred to as "Present invention 1," "Present Invention 2," "Comparative Example 1," and "Comparative Example 2"). A soy sauce yeast (*Zygosaccharomyces rouxii*) was added to the soy sauce moromi of each lot so that the cell count would be $5\times10^5$ cells per 1 g of moromi. Agitation was performed for the moromi of Comparative Example 1 for 3 days, the moromi of Comparative Example 2 for 5 days, the moromi of Present Invention 1 for 7 days, and the moromi of Present Invention 2 for 9 days, during which the moromi temperature was kept at 20° C. Thus, moromi samples having viable soy sauce yeast cell count per 1 g of moromi reaching $1\times10^6$, $5\times10^6$, $1\times10^7$, and $3\times10^7$ cells were obtained.

(3) Addition of Carbohydrate Raw Material and Adjustment of Common Salt Concentration Then, the soy sauce koji (1.6 kg) described in (1) above and hydrated crystal glucose (Showa Sanyo Co., Ltd.) (0.35 kg) were added to the moromi of each lot obtained above. Further, water (1.7 L) was added. thereto so that the common salt concentration in mature moromi juice would be 6.5 w/v %.

(4) Maturation

Thereafter, agitation was adequately performed for maturation, during which the moromi temperature was kept at 25° C. Four months after the start of production, the moromi samples were pressed to obtain raw soy sauce samples, followed by pasteurisation and racking. Thus, four different low common salt soy sauce samples were obtained. The obtained low common salt soy sauce samples were subjected to component analysis and sensory evaluation. Table 1 shows component analysis results. Table 2 shows sensory evaluation results.

(Component Analysis)

The common salt concentration, the ethanol concentration, the total nitrogen concentration, and pH were determined in accordance with the methods described in "Experimental Method for Soy Sauce" edited by the Japan Soy Sauce Inspection Institute (issued on Mar. 1, 1985). In addition, the succinic acid and glucose concentrations were determined by high-performance liquid chromatography analysis.

(Analysis of Alcohols)

The concentrations of 2-phenyl ethanol, isobutyl alcohol, and isoamyl alcohol were determined by the quantitative analysis method using gas chromatography as described in the Journal of Agricultural and Food Chemistry Vol. 39, 934, 1991.

(Sensory Evaluation)

Sensory evaluation was performed by 20 panelists who had been trained to have the ability to discriminate among samples using a grading system. Specifically, the low common salt soy sauce samples were compared with a commercially available reduced common salt soy sauce (Kikkoman Corporation) based on the following scales: Not different: 0; Slightly different: 1; Different: 2; Somewhat obviously different: 3; Obviously different: 4; and Significantly different: 5. If a sample was found to have a flavor superior to that of the commercially available reduced common salt soy sauce, the sample was marked with (+). On the other hand, if a sample was found to have a flavor inferior to that of the same, the sample was marked with (−).

In addition, each FIGURE for grades is an average of grades given by the 20 panelists for the relevant lot in table 2. The symbol "**," "*," and "−" used in the Evaluation columns refer to "significant at the 1% level of significance," "significant at the 5% level of significance," and "Not significant," respectively.

(Measurement of Viable Yeast Cell Count)

The viable yeast cell count was measured in accordance with the method described in "Food Microbiology Handbook" (edited by Hisao Yoshii, Yasuyuki Kaneko, and Kazuo Yamaguchi, Gihodo Shuppan Co., Ltd., p. 603).

TABLE 1

| Lot | Viable soy sauce yeast cell count per 1 g of moromi upon addition of carbohydrate raw material (cells) | Common salt concentration in mature moromi juice (w/v %) | Low common salt soy sauce component analysis values | | |
|---|---|---|---|---|---|
| | | | Ethanol concentration (v/v %) | Total nitrogen concentration (w/v %) | pH |
| Present Invention 1 | $1 \times 10^7$ | 6.5 | 6.5 | 1.7 | 5.0 |
| Present Invention 2 | $3 \times 10^7$ | 6.5 | 6.8 | 1.7 | 5.2 |
| Compeartive Example 1 | $1 \times 10^6$ | 6.5 | # | # | # |
| Compeartive Example 2 | $5 \times 10^6$ | 6.5 | 5.2 | 1.7 | 4.5 |

TABLE 1-continued

| Lot | Viable soy sauce yeast cell count per 1 g of moromi upon addition of carbohydrate raw material (cells) | Common salt concentration in mature moromi juice (w/v %) | Low common salt soy sauce component analysis values | | pH |
|---|---|---|---|---|---|
| | | | Ethanol concentration (v/v %) | Total nitrogen concentration (w/v %) | |
| Commercially available reduced common salt soy sauce | | 8.4 | 5.5 | 1.9 | 4.7 |

: Spoilage took place and thus moromi was not subjected to component analysis in this case.

TABLE 2

| Lot | Viable soy sauce yeast cell count per 1 g of moromi upon addition of carbohydrate raw material (cells) | Sensory evaluation | | |
|---|---|---|---|---|
| | | Average grade | Evaluation | Remarks |
| Present Invention 1 | $1 \times 10^7$ | +2.8 | ** | Favorable flavor |
| Present Invention 2 | $3 \times 10^7$ | +4.0 | ** | Favorable flavor |
| Compeartive Example 1 | $1 \times 10^6$ | # | # | Spoilage |
| Compeartive Example 2 | $5 \times 10^6$ | −1.6 | ** | Slightly sour odor |

: Spoilage took place and thus moromi was not subjected to component analysis in this case.

Based on the results shown in tables 1 and 2, it is understood that if the common salt concentration in mature moromi juice is adjusted to 6.5 w/v %, it would disadvantageously cause a low common salt soy sauce to become spoiled or have a sour taste or odor in cases in which carbohydrate raw materials are added within a period during which the viable soy sauce yeast cell count per 1 g of moromi is less than $1 \times 10^7$ cells (e.g., $1 \times 10^6$ cells (Comparative Example 1) or $5 \times 10^6$ cells (Comparative Example 2))

Meanwhile, it is understood that even if the common salt concentration in mature moromi juice is adjusted to 6.5 w/v %, a low common salt soy sauce would not become spoiled in cases in which carbohydrate raw materials are added within a period during which the viable soy sauce yeast cell count per 1 g of moromi is $1 \times 10^7$ cells or more (Present Invention 1 and Present Invention 2). A reduced common salt soy sauce having a favorable flavor can be obtained.

Example 2

A low common salt soy sauce was obtained in the manner described above except that the common salt concentration of moromi was adjusted by adding soy sauce koji and glucose as a carbohydrate raw material at amounts listed in table 3 and further adding water (or water and an aqueous common salt solution) at an amount listed in table 3 in the method for producing the low common salt soy sauce of Present Invention 2 (viable soy sauce yeast cell count per 1 g of moromi upon addition of carbohydrate raw material: $3 \times 10^7$ cells) in Example 1. Component analysis and sensory evaluation of the thus obtained low common salt soy sauce were carried out as in the case of Example 1. Tables 4 to 6 show the results.

Note that the common salt concentration of moromi is adjusted by changing the proportions of water and an aqueous common salt solution to be added depending on the desired final common salt concentration. This is because it is necessary to change the concentration depending on the moisture content of the koji, as well.

TABLE 3

| Lot | Soy sauce koji (kg) | Glucose (kg) | Water and aqueous common salt solution (L) | Common salt concentration in mature moromi juice (w/v %) |
|---|---|---|---|---|
| Compeartive Example 3 | 4.0 | 2.00 | 11.0 | 2.0 |
| Present Invention 3 | 2.4 | 0.80 | 5.1 | 4.0 |
| Present Invention 2 | 1.6 | 0.35 | 1.7 | 6.5 |
| Present Invention 4 | 1.6 | 0.20 | 1.7 | 12.0 |
| Compeartive Example 4 | 1.6 | 0 | 1.4 | 14.5 |

TABLE 4

| Lot | Common salt concentration in mature moromi juice (w/v %) | Low common salt soy sauce component analysis values | | pH |
|---|---|---|---|---|
| | | Ethanol concentration (v/v %) | Total nitrogen concentration (w/v %) | |
| Compeartive Example 3 | 2.0 | # | # | 4.1 |
| Present Invention 3 | 4.0 | 8.5 | 1.4 | 5.4 |
| Present Invention 2 | 6.5 | 6.8 | 1.7 | 5.2 |
| Present Invention 4 | 12.0 | 4.5 | 1.6 | 5.1 |
| Compeartive Example 4 | 14.5 | 3.5 | 1.9 | 5.5 |

: Spoilage took place and thus moromi was not subjected to component analysis in this case.

TABLE 5

| Lot | Common salt concentration in mature moromi juice (w/v %) | Component concentration (ug/ml) per 1.0 w/v % of total nitrogen concentration | | | |
|---|---|---|---|---|---|
| | | 2-phenyl ethanol | Isobutyl alcohol | Isoamyl alcohol | Succinic acid |
| Compeartive Example 3 | 2.0 | # | # | # | # |
| Present Invention 3 | 4.0 | 27.3 | 37.6 | 64.2 | 917 |
| Present Invention 2 | 6.5 | 18.6 | 14.5 | 27.4 | 836 |
| Present Invention 4 | 12.0 | 8.9 | 11.0 | 16.0 | 505 |
| Compeartive Example 4 | 14.5 | 5.1 | 7.9 | 14.6 | 257 |
| commercially available reduced common salt soy sauce | 8.4 | 4.5 | 8.2 | 7.6 | 250 |

: Spoilage took place and thus moromi was not subjected to component analysis in this case.

TABLE 6

| Lot | Common salt concentration in mature moromi juice (w/v %) | Sensory evaluation | | |
|---|---|---|---|---|
| | | Average grade | Evaluation | Remarks |
| Compeartive Example 3 | 2.0 | # | # | Spoilage |
| Present Invention 3 | 4.0 | +4.5 | ** | Favorable flavor |
| Present Invention 2 | 6.5 | +4.0 | ** | Favorable flavor |
| Present Invention 4 | 12.0 | +1.8 | ** | Favorable flavor |
| Compeartive Example 4 | 14.5 | +0.9 | — | Relatively favorable flavor |

: Spoilage took place and thus moromi was not subjected to component analysis in this case.

Based on the results shown in tables 4 to 6, it is understood that it is important to adjust the common salt concentration of moromi after the addition of carbohydrate raw materials so that the common salt concentration of mature moromi juice would be 4.0 to 12.0 w/v % because when the common salt concentration of mature moromi juice is less than 4.0 w/v % (Comparative Example 3), it would disadvantageously cause a low common salt soy sauce to become spoiled as shown in Table 4. On the other hand, it is also understood that when it exceeds 12.0 w/v % (Comparative Example 4) as shown in table 5, the concentrations of 2-phenyl ethanol, isobutyl alcohol, isoamyl alcohol and succinic acid decrease. Meanwhile, it is understood that a low common salt soy sauce having favorable flavor, in which the ethanol concentration is 4.0 v/v % or more while the 2-phenyl ethanol concentration per 1.0 w/v % of total nitrogen concentration is 7.0 μg/ml or more, the isobutyl alcohol concentration per 1.0 w/v % of total nitrogen concentration is 10.0 or more, and the isoamyl alcohol concentration per 1.0 w/v % of total nitrogen concentration is 15.0 μg/ml or more, and in which the succinic acid concentration per 1.0 w/v % of total nitrogen concentration is 500 μg/ml or more, can be obtained when the common salt concentration of the moromi is adjusted in a manner such that moromi juice after maturation would be 4.0 to 12.0 w/v % (Present Invention 2, Present Invention 3, and Present Invention 4).

Example 3

A low common salt soy sauce (Present invention 5) was obtained in the manner described above except that soy sauce koji (1.4 kg) and roasted and milled wheat (0.35 kg) as a carbohydrate raw material were added in the method for producing the low common salt soy sauce of Present Invention 2 (the viable soy sauce yeast cell count per 1 g of moromi upon addition of carbohydrate raw material: $3 \times 10^7$ cells) in Example 1.

The obtained low common salt soy sauce (Present Invention 5) was compared with Present Invention 2 obtained in Example 1 (using glucose as a carbohydrate raw material). In addition, sensory evaluation was carried out as in the case of Example 1 with the use of a commercially available reduced common salt soy sauce (Kikkoman Corporation) as a control. Tables 7 to 10 show the results.

TABLE 7

| Lot | Carbohydrate raw material | | | Water and aqueous common salt solution (L) | Common salt concentration in mature moromi juice (w/v %) |
|---|---|---|---|---|---|
| | Soy sauce koji (kg) | Glucose (kg) | Roasted and milled wheat (kg) | | |
| Present Invention 2 | 1.6 | 0.35 | | 1.7 | 6.5 |
| Present Invention 5 | 1.4 | | 0.35 | 1.7 | 6.5 |

TABLE 8

| Lot | Low common salt soy sauce component analysis values | | | |
|---|---|---|---|---|
| | Common salt concentration (w/v %) | Ethanol concentration (v/v %) | Total nitrogen concentration (w/v %) | pH |
| Present Invention 2 | 6.5 | 6.8 | 1.7 | 5.2 |
| Present Invention 5 | 6.5 | 6.5 | 1.6 | 5.0 |

TABLE 9

| Lot | Component concentration (μg/ml) per 1.0 w/v % of total nitrogen concentration | | | |
|---|---|---|---|---|
| | 2-phenyl ethanol | Isobutyl alcohol | Isoamyl alcohol | Succinic acid |
| Present Invention 2 | 18.6 | 14.5 | 27.4 | 836 |
| Present Invention 5 | 7.6 | 14.9 | 21.5 | 520 |

TABLE 10

| Lot | Sensory evaluation | | |
|---|---|---|---|
| | Average grade | Evaluation | Remarks |
| Present Invention 2 | +4.0 | ** | Favorable flavor |
| Present Invention 5 | +3.5 | ** | Favorable flavor |

Based on the results shown in tables 7 to 10, it is understood that roasted and milled wheat, which is a gelatinized cereal, is rapidly saccharified by enzymes (e.g., amylase) from a newly added soy sauce koji in moromi to yield glucose, and glucose is assimilated by the soy sauce yeast, resulting in accumulation of ethanol, 2-phenyl ethanol, isobutyl alcohol, and isoamyl alcohol, which are known as important aromatic components of soy sauce, in soy sauce moromi at high concentrations. Thus, a low common salt soy sauce having a favorable flavor can be obtained without using special means.

Example 4

A low common salt soy sauce (Present Invention 6) was obtained in the above manner except that glucose (0.6 kg) was added as a carbohydrate raw material without the addition of soy sauce koji in step (3) of the method for producing the low common salt soy sauce of Present Invention 2 (viable soy sauce yeast cell count per 1 g of moromi upon addition of a carbohydrate raw material: $3 \times 10^7$ cells) in Example 1, and at the same time, water and an aqueous common salt solution (1.1 L in total) were added so that the final common salt concentration in moromi would be 8%.

The obtained low common salt soy sauce (Present Invention 6) was compared with Present Invention 2 obtained in Example 1. In addition, sensory evaluation was performed using a commercially available reduced common salt soy sauce (Kikkoman Corporation) as a control as in the case of Example 1. Tables 11 to 14 show the results.

Based on the results shown in tables 11 to 14, it is understood that a low common salt soy sauce having a favorable flavor, in which the concentration of ethanol known as an important aromatic component in soy sauce is 4.0 v/v % or more while the 2-phenyl ethanol concentration per 1.0 w/v % of total nitrogen concentration is 7.0 or more, the isobutyl alcohol concentration per 1.0 w/v % of total nitrogen concentration is 10.0 μg/ml or more, and the isoamyl alcohol concentration per 1.0 w/v % of total nitrogen concentration is 15.0 μg/ml or more, and in which the succinic acid concentration per 1.0 w/v % of total nitrogen concentration is 500 μg/ml or more, can be obtained as a result of assimilatiion of added glucose by soy sauce yeast.

Note that since glucose alone was added without addition of soy sauce koji, the total nitrogen content significantly decreased. Therefore, the total nitrogen content was adjusted to the total nitrogen content for Present Invention 6 (0.7 (W/V) %) for sensory evaluation.

TABLE 11

| Lot | Soy sauce koji (kg) | Carbohydrate raw material (glucose) (kg) | Water and aqueous common salt solution CD | Common salt concentration in mature moromi juice (w/v %) |
|---|---|---|---|---|
| Present Invention 2 | 1.6 | 0.35 | 1.7 | 6.5 |
| Present Invention 6 | 0 | 0.60 | 1.1 | 8.0 |

TABLE 12

Low common salt soy sauce component analysis values

| Lot | Common salt concentration (w/v %) | Ethanol concentration (v/v %) | Total nitrogen concentration (w/v %) | pH |
|---|---|---|---|---|
| Present Invention 2 | 6.5 | 6.8 | 1.7 | 5.2 |
| Present Invention 6 | 8.0 | 8.9 | 0.7 | 4.7 |

TABLE 13

Component concentration (μg/ml) per 1.0 w/v % of total nitrogen concentration

| Lot | 2-phenyl ethanol | Isobutyl alcohol | Isoamyl alcohol | Succinic acid |
|---|---|---|---|---|
| Present Invention 2 | 18.6 | 14.5 | 27.4 | 836 |
| Present Invention 6 | 113.3 | 220.7 | 99.6 | 1643 |

TABLE 14

| Lot | Sensory evaluation | | |
|---|---|---|---|
| | Average grade | Evaluation | Remarks |
| Present Invention 2 | +4.0 | ** | Favorable flavor |
| Present Invention 6 | +2.6 | ** | Favorable flavor |

Example 5

Production of Starch-Rich Koji

Warm water (80° C.) was added to defatted soybeans (6 kg) (130 w/w %). The mixture was heated and steam-boiled under pressure using saturated water vapor at a steam pressure of 2 kg/cm² (gauge pressure) for 20 minutes. In addition, raw wheat (14 kg) was roasted and milled by a conventional method. Next, the two processed raw materials were mixed to prepare a raw material for koji production with a moisture content of approximately 40 w/w %.

Next, this koji-making raw material was inoculated with a bran seed koji of *Aspergillus oryzae* (ATCC14895) (effective spore count: $1 \times 10^9$ spores/g) at 0.1 w/w %, which was then heaped in a container. The container was subjected to a usual koji-making process for 42 hours to obtain a starch-rich soy sauce koji with a wheat proportion of 70%.

Further, warm water (80° C.) was added to defatted soybeans (0.2 kg) (130 w/w %). The mixture was heated and steam-boiled under pressure using saturated water vapor at a steam pressure of 2 kg/cm² (gauge pressure) for 20 minutes. In addition, raw wheat (19.8 kg) was roasted and milled by a conventional method. Next, the two processed raw materials were mixed to prepare a raw material for koji production with a moisture content of approximately 40 w/w %.

Next, this koji-making raw material was inoculated with a bran seed koji of *Aspergillus oryzae* (ATCC14895) (effective spore count: 1×10⁹ spores/g) at 0.1 w/w %, which was then heaped in a container. The container was subjected to a usual koji-making process for 42 hours to obtain a starch-rich soy sauce koji with a wheat proportion of 99%.

(Preparation of Moromi)

Low common salt soy sauces (Present Inventions 7 and 8) were obtained in the above manner except that starch-rich koji prepared above was added as a carbohydrate raw material at an amount shown in table 15 without the addition of soy sauce koji in step (3) of the method for producing the low common salt soy sauce of Present Invention 2 (viable soy sauce yeast cell count per 1 g of moromi upon addition of a carbohydrate raw material: 3×10⁷ cells) in Example 1, and at the same time, water and an aqueous common salt solution (1.6 L in total) were added so that the final common salt concentration in moromi would be 7.0%.

TABLE 15

| Lot | Soy sauce koji (kg) | Carbohydrate raw material Glucose | Starch-rich soy sauce koji (kg) | Water and aqueous common salt solution (L) | Common salt concentration in mature moromi juice (w/v %) |
|---|---|---|---|---|---|
| Present Invention 2 | 1.6 | 0.35 | | 1.7 | 6.5 |
| Present Invention 7 Soybean:Wheat (30:70) | | | 1.6 | 1.6 | 7.0 |
| Present Invention 8 Soybean:Wheat (1:99) | | | 1.6 | 1.6 | 7.0 |

The obtained low common salt soy sauces (Present Inventions 7 and 8) were compared with Present Invention 2 obtained in Example 1 (using glucose as a carbohydrate raw material). In addition, sensory evaluation was performed using a commercially available reduced common salt soy sauce (Kikkoman Corporation) as a control as in the case of Example 1. Tables 16 to 18 show the results.

Based on the results shown in tables 16 to 18, it is understood that a low common salt soy sauce having a favorable flavor, in which the concentration of ethanol known as an important aromatic component in soy sauce is 4.0 v/v % or more while the 2-phenyl ethanol concentration per 1.0 w/v % of total nitrogen concentration is 7.0 µg/ml or more, the isobutyl alcohol concentration per 1.0 w/v % of total nitrogen concentration is 10.0 µg/ml or more, and the isoamyl alcohol concentration per 1.0 w/v % of total nitrogen concentration is 15.0 µg/ml or more, and in which the succinic acid concentration per 1.0 w/v % of total nitrogen concentration is 500 µg/ml or more, can be obtained without using special means as a result of rapid decomposition of starch-rich soy sauce koji into glucose and assimilation of glucose by soy sauce yeast.

TABLE 16

Low common saltsoy sauce component analysis values

| Lot | Common salt concentration (w/v %) | Ethanol concentration (v/v %) | Total nitrogen concentration (w/v %) | pH |
|---|---|---|---|---|
| Present Invention 2 | 6.5 | 6.8 | 1.7 | 5.2 |
| Present Invention 7 | 7.0 | 7.7 | 1.7 | 5.2 |
| Present Invention 8 | 7.0 | 8.2 | 1.4 | 5.4 |

TABLE 17

| | Component concentration (µg/ml) per 1.0 w/v % of total nitrogen concentration | | | |
|---|---|---|---|---|
| Lot | 2-phenyl ethanol | Isobutyl alcohol | Isoamyl alcohol | Succinic acid |
| Present Invention 2 | 18.6 | 14.5 | 27.4 | 836 |
| Present Invention 7 | 11.9 | 21.2 | 37.5 | 588 |
| Present Invention 8 | 18.1 | 14.7 | 40.3 | 593 |

TABLE 18

| | Sensory evaluation | | |
|---|---|---|---|
| Lot | Average grade | Evaluation | Remarks |
| Present Invention 2 | +4.0 | ** | Favorable flavor |
| Present Invention 7 | +3.5 | ** | Favorable flavor |
| Present Invention 8 | +3.2 | ** | Favorable flavor |

Example 6

Low common salt soy sauces (Present Inventions 9, 10, 11, and 12) were obtained as in the case of Present invention 2 except that soy sauce koji, a carbohydrate raw material, and a protein raw material were added at the amounts listed in table 19 in step (3) of the method for producing the low common salt soy sauce of Present Invention 2 (the viable soy sauce yeast cell count per 1 g of moromi upon the addition of a carbohydrate raw material: 3×10⁷ cells) in Example 1, during which water and an aqueous common salt solution (1.9 L in total) were added so as to result in the common salt concentration shown in table 19.

Crystal glucose (Showa Sangyo Co., Ltd.) and starch-rich soy sauce koji having a wheat content of 70% obtained in Example 5 were used as carbohydrate raw materials. In addition, a product obtained by puffing soybeans (Puffmin F; Kikkoman Corporation) and a commercially available wheat gluten product (VITEN; Roquette Japan) were used as protein raw materials.

TABLE 19

| Lot | Carbohydrate raw material | | Protein raw material | | Water and aqueous common salt solution (L) | Common salt concentration in mature moromi juice (w/v %) |
|---|---|---|---|---|---|---|
| | Soy sauce koji (kg) | Glucose (kg) | Starch-rich soy sauce koji (kg) | Soybean (kg) | Wheat gluten (kg) | | |
| Present Invention 2 | 1.6 | 0.35 | | | | 1.7 | 6.5 |
| Present Invention 9 | | | 1.6 | 0.5 | | 1.9 | 8.0 |
| Present Invention 10 | 1.6 | 0.35 | | 0.5 | | 1.9 | 7.0 |
| Present Invention 11 | | | 1.6 | | 0.35 | 1.9 | 8.0 |
| Present Invention 12 | 1.6 | 0.35 | | | 0.35 | 1.9 | 7.0 |

The obtained low common salt soy sauces (Present Inventions 9, 10, 11, and 12) were compared with Present Invention 2 obtained in Example 1 (using glucose as a carbohydrate raw material). In addition, sensory evaluation was performed using a commercially available reduced common salt soy sauce (Kikkoman Corporation) as a control as in the case of Example 1. Tables 20 to 22 show the results.

Based on the results shown in tables 20 to 22, it is understood that a low common salt soy sauce having a favorable flavor and a high total nitrogen concentration, in which the concentration of ethanol known as an important aromatic component in soy sauce is 4.0 v/v % or more while the 2-phenyl ethanol concentration per 1.0 w/v % of total nitrogen concentration is 7.0 μg/ml or more, the isobutyl alcohol concentration per 1.0 w/v % of total nitrogen concentration is 10.0 μg/ml or more, and the isoamyl alcohol concentration per 1.0 w/v % of total nitrogen concentration is 15.0 μg/ml or more, and in which the succinic acid concentration per 1.0 w/v % of total nitrogen concentration is 500 μg/ml or more, can be obtained without using special means.

TABLE 20

Low common salt soy sauce component analysis values

| Lot | Common salt concentration (w/v %) | Ethanol concentration (v/v %) | Total nitrogen concentration (w/v %) | pH |
|---|---|---|---|---|
| Present Invention 2 | 6.5 | 6.8 | 1.7 | 5.2 |
| Present Invention 9 | 8.0 | 6.5 | 1.9 | 5.2 |
| Present Invention 10 | 7.0 | 5.6 | 2.1 | 5.2 |
| Present Invention 11 | 8.0 | 7.0 | 2.1 | 5.2 |
| Present Invention 12 | 7.0 | 7.4 | 2.3 | 5.2 |

TABLE 21

Component concentration (μg/ml) per 1.0 w/v % of total nitrogen concentration

| Lot | 2-phenyl ethanol | Isobutyl alcohol | Isoamyl alcohol | Succinic acid |
|---|---|---|---|---|
| Present Invention 2 | 18.6 | 14.5 | 27.4 | 836 |
| Present Invention 9 | 12.2 | 19.2 | 25.7 | 658 |

TABLE 21-continued

Component concentration (μg/ml) per 1.0 w/v % of total nitrogen concentration

| Lot | 2-phenyl ethanol | Isobutyl alcohol | Isoamyl alcohol | Succinic acid |
|---|---|---|---|---|
| Present Invention 10 | 9.9 | 14.9 | 19.3 | 543 |
| Present Invention 11 | 11.5 | 18.8 | 24.5 | 557 |
| Present Invention 12 | 9.6 | 15.9 | 19.9 | 517 |

TABLE 22

| | Sensory evaluation | | |
|---|---|---|---|
| Lot | Average grade | Evaluation | Remarks |
| Present Invention 2 | +4.0 | ** | Favorable flavor |
| Present Invention 9 | +2.4 | ** | Favorable flavor |
| Present Invention 10 | +2.5 | ** | Favorable flavor |
| Present Invention 11 | +2.5 | ** | Favorable flavor |
| Present Invention 12 | +3.1 | ** | Favorable flavor |

Example 7

The product of the present invention was subjected to drying and powderization. Upon drying and powderization, dextrin (PINE-DEX #2) (60 g) was added as an excipient to Present Invention 2 (300 ml) and the mixture was heated to 80° C., followed by spray drying. Thus, Present Invention 13 was obtained.

Spray drying was performed using a MOBILE MINOR™ spray dryer (TM-2000 Model-A; NIRO JAPAN) under the following conditions: 170° C. to 180° C. (outlet temperature: 90° C.); liquid supply: 15 ml/min; and number of atomizer rotations: 20000 to 22000 rpm.

Table 23 lists the analysis values for the obtained soy sauce powder. For comparison, a dark soy sauce (Kikkoman Corporation) and Comparative Example 4 were subjected to drying and powderization as in the case of Present Invention 13. As a result, the soy sauce powder obtained as Present Invention 13 was confirmed to contain larger amounts of 2-phenyl ethanol and succinic acid.

For soy sauce powder analysis, a soy sauce powder was dissolved in water at an adequate dilution rate, followed by analysis as in the ease of soy sauce. Then, conversion calculation was carried out based on the dilution rate.

As a result, it was revealed that a soy sauce powder having a favorable flavor and containing 2-phenyl ethanol and succinic acid at high concentrations can be obtained.

In addition, it was also revealed that the soy sauce powder of the present invention is unlikely to become hygroscopic and deliquescent and thus it does not form powder blocks during storage. Further, it was revealed that the soy sauce powder of the present invention has very low stickiness and thus it is likely to be uniformly mixed with other powder components.

TABLE 23

| Sample name | Original liquid | TN (w/w %) | NaCl (w/w %) | Component concentration (µg/g) per 1.0 w/w % of total nitrogen concentration | |
|---|---|---|---|---|---|
| | | | | 2-phenyl ethanol | Succinic acid |
| Present Invention 13 | Present Invention 2 | 3.3 | 13.2 | 22.5 | 790 |
| Compeartive Example 5 | Dark soy sauce | 1.1 | 27.9 | 6.3 | 213 |
| Compeartive Example 6 | Compeartive Example 4 | 3.1 | 24.9 | 4.9 | 270 |

Example 8

Test of Changing the Amount of Sugar to be Added

The low common salt soy sauce of the present invention was obtained in the manner described above except that the common salt concentration of moromi was adjusted by adding soy sauce koji and glucose as a carbohydrate raw material at amounts listed in table 24 and further adding water and an aqueous common salt solution at amounts listed in table 24 in the method for producing the low common salt soy sauce of Present invention 2 (viable soy sauce yeast cell count per 1 g of moromi upon addition of carbohydrate raw material: $3 \times 10^7$ cells) in Example 1, followed by adequate agitation as in the case of Example 1, fermentation, maturation, press, filtration, pasteurisation, and clarification. Accordingly, it is understood that a low common salt soy sauce, in which the concentration of ethanol known as an important aromatic component in soy sauce is 4.0 v/v % or more while the 2-phenyl ethanol concentration per 1.0 w/v % of total nitrogen concentration is 7.0 µg/ml or more, the isobutyl alcohol concentration per 1.0 w/v % of total nitrogen concentration is 10.0 µg/ml or more, and the isoamyl alcohol concentration per 1.0 w/v % of total nitrogen concentration is 15.0 µg/ml or more, and in which the succinic acid concentration per 1.0 w/v % of total nitrogen concentration is 500 µg/ml or more, can be obtained without using special means as shown in table 25. Meanwhile, in the case of the low common salt soy sauce (Comparative Example 7) to which glucose (0.75 kg) had been added, it was confirmed that the glucose concentration (remaining glucose content) per 1% (w/v) of total nitrogen concentration was as high as 35.4 mg/ml. In addition, it was revealed that when a soy sauce powder is formed by drying and powderizing the above low common salt soy sauce of Comparative Example 7, the obtained soy sauce powder is likely to become hygroscopic and deliquescent and thus it easily forms powder blocks during storage. Further, it was revealed that such soy sauce powder has high stickiness and thus it is less likely to be uniformly mixed with other powder components.

TABLE 24

| Lot | Soy sauce koji (kg) | Carbohydrate raw material (glucose) (kg) | Water and aqueous common salt solution (L) | Common salt concentration in mature moromi juice (w/v %) |
|---|---|---|---|---|
| Present Invention 2 | 1.6 | 0.35 | 1.7 | 6.5 |
| Present Invention 14 | 1.6 | 1.10 | 4.8 | 4.1 |
| Present Invention 15 | 1.6 | 0.45 | 1.7 | 11.6 |
| Compeartive Example 7 | 1.6 | 0.75 | 1.5 | 6.7 |

TABLE 25

| | Low common salt soy sauce component analysis values | | | | Component concentrations (µg/ml) per 1.0 w/v % of total nitrogen concentration | | | | Glucose concentration (mg/ml) per 1.0 w/v % of total nitrogen concentration |
|---|---|---|---|---|---|---|---|---|---|
| | Common salt concentration (w/v %) | Ethanol concentration (v/v %) | Total nitrogen concentration (w/v %) | pH | 2-phenyl ethanol | Isobutyl alcohol | Isoamyl alcohol | Succinic acid | |
| Present Invention 2 | 6.5 | 6.8 | 1.7 | 5.2 | 18.6 | 14.5 | 27.4 | 836 | 3.0 |
| Present Invention 14 | 4.1 | 9.1 | 1.4 | 5.2 | 34.3 | 39.4 | 65.2 | 960 | 4.7 |
| Present Invention 15 | 11.6 | 4.9 | 1.8 | 5.2 | 9.7 | 12.3 | 18.3 | 515 | 4.9 |
| Compeartive Example 7 | 6.7 | 7.1 | 1.7 | 5.2 | 12.8 | 20.4 | 26.6 | 735 | 35.4 |

Example 9

The total sugar amount in moromi juice immediately before addition of carbohydrate raw materials and the total sugar amount in raw materials to be added were separately determined by the methods described below for Present Inventions 1, 12, 14, and 15 and Comparative Examples 3, 4, and 7.

(A Method for Analyzing the Total Sugar Amount in Moromi Juice Immediately Before the Addition of Carbohydrate Raw Materials)

A moromi sample was obtained from moromi (the viable soy sauce yeast cell count per 1 g of moromi immediately before the addition of carbohydrate raw materials: $1 \times 10^7$ cells or more) homogenized via mixing by agitation, followed by filter paper filtration (using No. 2 filter paper, a funnel, and a 200-ml Erlenmeyer flask). Thus, clear moromi juice was prepared.

2.5% hydrochloric acid (100 ml) was added to 10 ml of the moromi juice, followed by hydrolysis induced by heating at 100° C. for 2.5 hours. The resulant was filtered and neutralized with sodium hydroxide. The obtained liquid was adjusted to 250 ml with water. Reducing sugar measurement was carried out by the Fehling-Lehman-Schoorl method described below. The product of the analyzed value and the moromi volume was designated as the sugar source amount in moromi juice immediately before the addition of sugar sources.

(Fehling-Lehman-Schoorl Method)

i. A sample (10 ml) is collected (note that the amount of the sample may be increased or decreased depending on the expected amount of sugar) and adjusted to 250 mL. Thus, a sample solution is prepared.

ii. Copper sulfate (69.3 g) is dissolved in distilled water so as to result in 1 L of reagent. Thus, reagent a is prepared iii. Rochelle salt (346 g) and sodium hydroxide (103 g) are dissolved in distilled water so as to result in 1 L of reagent. Thus, reagent b is prepared.

iv. Reagents a and b are separately collected in 200-mL Erlenmeyer flasks (10 mL each). The sample solution (10 mL) and distilled water (20 mL) are added to each flask so as to result in a total volume of 50 mL. The flasks are heated to achieve boiling within 3 minutes. After boiling for exactly 2 minutes, the flasks are immediately immersed in water so as to be cooled to 25° C. During this procedure, it is necessary to carefully prevent the formed red precipitate of copper sulfate from coming into contact with air.

v. Next, a potassium iodide aqueous solution (10 mL, 30% by weight) and a sulfuric acid aqueous solution (10 mL, 25% by weight) are added to each flask. Then, titration is immediately initiated with 0.1 N sodium thiosulfate. A 1% starch solution (2 to 3 drops) is added as an indicator near the endpoint of titration (i.e., when a light yellow color is confirmed). Titration is continuously performed until the color developed by the starch reaction disappears so as to determine the endpoint of titration.

vi. The above procedures are carried out in the same manner except that distilled water is used instead of a sample solution. The sugar amount is calculated based on differences in the number of drops and the coefficient of sodium thiosulfate using a table (not shown). The desired value is determined based on the sugar amount and the dilution rate.

(A Method for Analyzing the Total Sugar Amount in Raw Materials Added)

The total sugar amount in raw materials added was calculated in the following manner. 2.5% hydrochloric acid (100 ml) was added to raw materials added (5 g), followed by hydrolysis induced by heating at 100° C. for 2.5 hours. The resultant was filtered and neutralized with sodium hydroxide. The obtained sample was adjusted with water to 500 ml. Then, the reducing sugar amount was determined by the Fehling-Lehman-Schoorl method. Then, the total sugar amount was calculated.

(Results)

The table shown below lists the measurement results.

TABLE 26

| | Carbohydrate raw material type | The total amount of sugar in raw materials to be added + The total amount of sugar in moromi (kg) | Final moromi volume (L) | The amount of sugar/final moromi volume (kg/L) | The common salt concentration in mature moromi juice (w/v %) |
|---|---|---|---|---|---|
| Present Invention 1 | Glucose + Soy sauce koji | 0.86 | 5.4 | 0.159 | 6.5 |
| Present Invention 2 | Glucose + Soy sauce koji | 0.81 | 5.4 | 0.150 | 6.5 |
| Present Invention 3 | Glucose + Soy sauce koji | 1.47 | 9.2 | 0.160 | 4.0 |
| Present Invention 4 | Glucose + Soy sauce koji | 0.66 | 5.4 | 0.122 | 12.0 |
| Present Invention 5 | Wheat + Soy sauce koji | 0.76 | 5.4 | 0.140 | 6.5 |
| Present Invention 6 | Glucose | 0.64 | 4.2 | 0.152 | 8.0 |
| Present Invention 7 | 70% koji | 0.70 | 5.3 | 0.132 | 7.0 |
| Present Invention 8 | 99% koji | 0.76 | 5.3 | 0.144 | 7.0 |
| Present Invention 9 | 70% koji + Soybean | 0.85 | 5.5 | 0.155 | 8.0 |
| Present Invention 10 | Glucose + Soy sauce koji + Soybean | 0.96 | 5.7 | 0.168 | 7.0 |
| Present Invention 11 | 70% koji + Wheat gluten | 0.75 | 5.5 | 0.136 | 8.0 |
| Present Invention 12 | Glucose + Soy sauce koji + Wheat gluten | 0.86 | 5.7 | 0.151 | 7.0 |
| Present Invention 14 | Glucose + Soy sauce koji | 1.82 | 9 | 0.202 | 4.1 |
| Present Invention 15 | Glucose + Soy sauce koji | 0.96 | 5.6 | 0.171 | 11.6 |
| Compeartive Example 3 | Glucose + Soy sauce koji | 2.45 | 15.2 | 0.161 | 2.0 |

TABLE 26-continued

|  | Carbohydrate raw material type | The total amount of sugar in raw materials to be added + The total amount of sugar in moromi (kg) | Final moromi volume (L) | The amount of sugar/final moromi volume (kg/L) | The common salt concentration in mature moromi juice (w/v %) |
|---|---|---|---|---|---|
| Compeartive Example 4 | — | 0.46 | 5.2 | 0.088 | 14.5 |
| Compeartive Example 7 | Glucose + Soy sauce koji | 1.21 | 5.5 | 0.220 | 6.7 |

Figure 1:
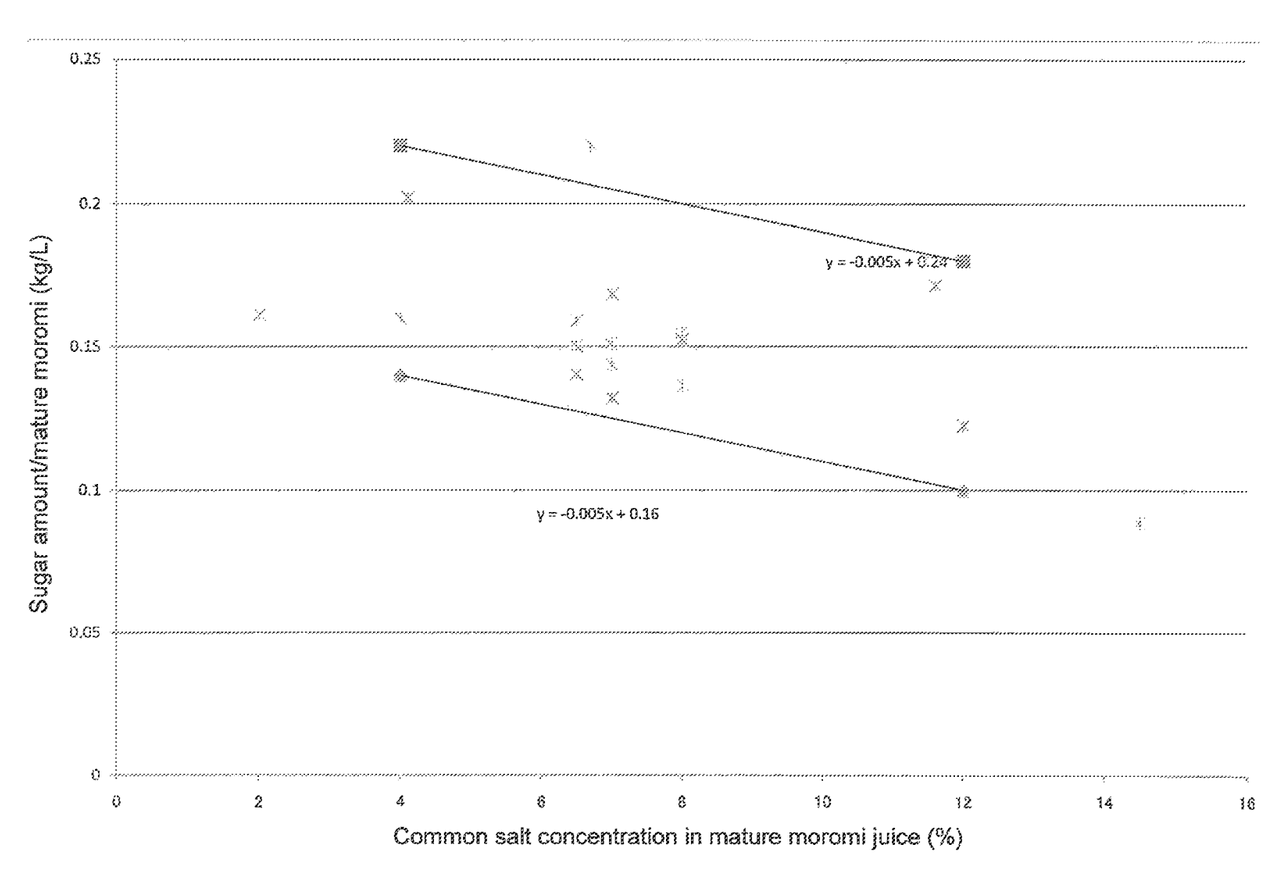
FIG. 1 is a dispersion diagram showing the relationship between the common salt concentration (w/v %) in mature moromi juice and the proportion of the sum of the total sugar amount (kg) in moromi juice immediately before the addition of carbohydrate raw materials and the total sugar amount (kg) in raw materials to be added with respect to the volume (L) of mature moromi (kg/L). In the diagram, the X axis denotes the former and the Y axis denotes the latter.

FIG. 1 shows a dispersion diagram in which the X axis denotes the common salt concentration (w/v %) in mature moromi juice and the Y axis denotes the proportion of the sum of the total amount (kg) of sugars in moromi juice immediately before the addition of carbohydrate raw materials and the total amount (kg) of sugars in raw materials to be added with respect to the volume (L) of mature moromi (kg/L). The following conditions are satisfied in any case of Present Inventions 1 to 12, 14, and 15, while on the other hand the conditions are not satisfied in any case of Comparative Examples 3, 4, and 7:

$$4.0 \leq X \leq 12.0;$$

$$Y \geq -0.005X + 0.16; \text{ and}$$

$$Y \leq -0.005X + 0.24.$$

In addition, as shown in table 25, the amount of glucose in moromi obtained as a final product per 1.0% (W/V) (TN) of total nitrogen concentration was 5.0 mg/ml or less for Present Inventions 1 to 12, 14, and 15. Thus, it was confirmed that the amount of sugar was low.

All publications, patents, and patent applications cited herein are incorporated herein by reference in. their entirety.

The invention claimed is:

1. A method for producing a low salt soy sauce, which comprises the steps of:
 (a) preparing moromi in which a viable soy sauce yeast cell count per 1 g of moromi is $1 \times 10^7$ cells or more and a salt concentration is 15.0 to 20.0 w/v %;
 (b) adding a carbohydrate raw material to the moromi prepared in step (a), and adjusting the salt concentration of the moromi in a manner such that the salt concentration of moromi juice after maturation is 4.0 to 12.0 w/v % by adding water or an aqueous common salt solution to the moromi;
 (c) carrying out fermentation and maturation of the moromi obtained in step (b) to prepare moromi juice; and
 (d) maintaining the moromi at a temperature 15 to 30° C. during steps (a)-(c);
 wherein the pH of the moromi juice after fermentation and maturation is 4.7 to 6.0, and wherein the carbohydrate raw material is at least one member selected from the group consisting of:
 glucose,
 a combination of glucose and soy sauce koji,
 a combination of wheat and soy sauce koji,
 starch-rich soy sauce koji,
 a combination of starch-rich soy sauce koji and soybean,
 a combination of starch-rich soy sauce koji and wheat gluten,
 a combination of glucose, soy sauce koji, and soybean, and
 a combination of glucose, soy sauce koji, and wheat gluten,
 wherein the starch-rich soy sauce koji is prepared with the use of raw materials comprising starch raw materials accounting for more than 65 w/w % of the raw materials and protein raw materials accounting for the remaining proportion thereof.

2. A method for producing a low salt soy sauce powder, which comprises drying and powderizing a low salt soy sauce obtained by the method according to claim 1.

* * * * *